(12) United States Patent
Shi et al.

(10) Patent No.: US 8,227,658 B2
(45) Date of Patent: Jul. 24, 2012

(54) FILM FORMED FROM A BLEND OF BIODEGRADABLE ALIPHATIC-AROMATIC COPOLYESTERS

(75) Inventors: Bo Shi, Neenah, WI (US); James H. Wang, Appleton, WI (US)

(73) Assignee: Kimberly-Clark Worldwide, Inc, Neenah, WI (US)

( * ) Notice: Subject to any disclaimer, the term of this patent is extended or adjusted under 35 U.S.C. 154(b) by 751 days.

(21) Appl. No.: 11/956,419

(22) Filed: Dec. 14, 2007

(65) Prior Publication Data

US 2009/0157020 A1 Jun. 18, 2009

(51) Int. Cl.
*A61F 13/15* (2006.01)
*B32B 27/36* (2006.01)
*B32B 27/06* (2006.01)

(52) U.S. Cl. ..... 604/359; 604/367; 604/378; 428/315.5; 428/330; 428/480; 442/394; 442/395; 442/398

(58) Field of Classification Search .................. 604/359, 604/367, 378; 428/315.5, 330, 480; 442/394, 442/395, 398
See application file for complete search history.

(56) References Cited

U.S. PATENT DOCUMENTS

| | | | |
|---|---|---|---|
| 3,137,592 | A | 6/1964 | Protzman et al. |
| 3,338,992 | A | 8/1967 | Kinney |
| 3,341,394 | A | 9/1967 | Kinney |
| 3,494,821 | A | 2/1970 | Evans |
| 3,502,538 | A | 3/1970 | Peterson |
| 3,502,763 | A | 3/1970 | Hartmann |
| 3,542,615 | A | 11/1970 | Dobo et al. |
| 3,655,129 | A | 4/1972 | Seiner |
| 3,692,618 | A | 9/1972 | Dorschner |

(Continued)

FOREIGN PATENT DOCUMENTS

EP 0565386 A1 10/1993

(Continued)

OTHER PUBLICATIONS

Search Report and Written Opinion for PCT/IB2008/053674 dated Apr. 29, 2009.

(Continued)

*Primary Examiner* — Tatyana Zalukaeva
*Assistant Examiner* — Ginger T Chapman
(74) *Attorney, Agent, or Firm* — Dority & Manning, P.A.

(57) ABSTRACT

A film that is formed from a biodegradable polymer blend of different aliphatic-aromatic copolyesters is provided. More specifically, the blend contains a first copolyester formed from a terephthalic acid monomer. The use of a terephthalic acid monomer results in a polymer chain containing 1,4-(para-) terephthalate units linked in a generally linear configuration (e.g., ~180°). The blend also contains a second aliphatic-aromatic copolyester formed from a phthalic acid and/or isophthalic acid monomer. The use of such a monomer results in a polymer chain containing 1,2-(ortho-) and/or 1,3-(meta-) linked units. The inclusion of 1,2-(ortho-) and/or 1,3-(meta-) linked units into the polymer backbone of the second copolyester introduces an angle or "kink" (e.g., ~120° kink for a 1,3-linkage) into the otherwise linear polymer chain. The "kinks" in the second copolyester backbone reduce its melting point and degree of crystallinity, which have an influence on its physical properties (e.g., toughness, tensile strength, and crystallization rate). Thus, the physical properties of the second copolyester may differ substantially from those of the first copolyester. In this regard, the "kinked" second copolyester can provide flexibility for forming films with a wide range of properties that is superior to that which may be achieved using either of copolyesters alone.

14 Claims, 3 Drawing Sheets

U.S. PATENT DOCUMENTS

| | | | |
|---|---|---|---|
| 3,802,817 A | 4/1974 | Matsuki et al. | |
| 3,849,241 A | 11/1974 | Butin et al. | |
| 3,963,656 A | 6/1976 | Meisert et al. | |
| 4,013,624 A | 3/1977 | Hoeschele | |
| 4,041,203 A | 8/1977 | Brock et al. | |
| 4,144,370 A | 3/1979 | Boulton | |
| 4,174,330 A | 11/1979 | Gilbert et al. | |
| 4,209,417 A | 6/1980 | Whyte | |
| 4,340,563 A | 7/1982 | Appel et al. | |
| 4,374,888 A | 2/1983 | Bornslaeger | |
| 4,535,113 A | 8/1985 | Foster et al. | |
| 4,704,116 A | 11/1987 | Enloe | |
| 4,766,029 A | 8/1988 | Brock et al. | |
| 4,789,699 A | 12/1988 | Kieffer et al. | |
| 4,797,468 A | 1/1989 | De Vries | |
| 4,857,593 A | 8/1989 | Leung et al. | |
| 4,886,512 A | 12/1989 | Damico et al. | |
| 4,925,890 A | 5/1990 | Leung et al. | |
| 4,931,492 A | 6/1990 | Foster et al. | |
| 5,003,023 A | 3/1991 | Foster et al. | |
| 5,028,648 A | 7/1991 | Famili et al. | |
| 5,028,658 A | 7/1991 | David et al. | |
| 5,073,316 A * | 12/1991 | Bizen et al. | 264/423 |
| 5,093,422 A | 3/1992 | Himes | |
| 5,102,465 A | 4/1992 | Lamond | |
| 5,169,706 A | 12/1992 | Collier, IV et al. | |
| 5,171,308 A * | 12/1992 | Gallagher et al. | 604/365 |
| 5,171,309 A * | 12/1992 | Gallagher et al. | 604/365 |
| 5,192,606 A | 3/1993 | Proxmire et al. | |
| 5,213,881 A | 5/1993 | Timmons et al. | |
| 5,284,703 A | 2/1994 | Everhart et al. | |
| 5,292,783 A | 3/1994 | Buchanan et al. | |
| 5,382,400 A | 1/1995 | Pike et al. | |
| 5,382,611 A | 1/1995 | Stepto et al. | |
| 5,397,834 A | 3/1995 | Jane et al. | |
| 5,446,079 A | 8/1995 | Buchanan et al. | |
| 5,464,688 A | 11/1995 | Timmons et al. | |
| 5,470,944 A | 11/1995 | Bonsignore | |
| 5,486,166 A | 1/1996 | Bishop et al. | |
| 5,490,846 A | 2/1996 | Ellis et al. | |
| 5,523,293 A | 6/1996 | Jane et al. | |
| 5,545,681 A * | 8/1996 | Honkonen | 524/115 |
| 5,558,659 A | 9/1996 | Sherrod et al. | |
| 5,559,171 A | 9/1996 | Buchanan et al. | |
| 5,580,911 A | 12/1996 | Buchanan et al. | |
| 5,599,858 A | 2/1997 | Buchanan et al. | |
| 5,605,961 A | 2/1997 | Lee et al. | |
| 5,641,562 A | 6/1997 | Larson et al. | |
| 5,649,916 A | 7/1997 | DiPalma et al. | |
| 5,665,152 A | 9/1997 | Bassi et al. | |
| 5,695,868 A | 12/1997 | McCormack | |
| 5,702,377 A | 12/1997 | Collier, IV et al. | |
| 5,747,648 A | 5/1998 | Bassi et al. | |
| 5,770,682 A | 6/1998 | Ohara et al. | |
| 5,817,721 A | 10/1998 | Warzelhan et al. | |
| 5,821,327 A | 10/1998 | Oota et al. | |
| 5,855,999 A | 1/1999 | McCormack | |
| 5,863,991 A * | 1/1999 | Warzelhan et al. | 525/426 |
| 5,880,254 A | 3/1999 | Ohara et al. | |
| 5,900,322 A | 5/1999 | Buchanan et al. | |
| 5,910,545 A | 6/1999 | Tsai et al. | |
| 5,922,379 A | 7/1999 | Wang | |
| 5,931,823 A | 8/1999 | Stokes et al. | |
| 5,932,497 A | 8/1999 | Morman et al. | |
| 5,939,192 A | 8/1999 | Rettenbacher et al. | |
| 5,945,480 A | 8/1999 | Wang et al. | |
| 5,965,708 A | 10/1999 | Bassi et al. | |
| 5,977,312 A | 11/1999 | Bassi et al. | |
| 5,981,012 A | 11/1999 | Pomplun et al. | |
| 5,985,396 A | 11/1999 | Kerins et al. | |
| 5,997,981 A | 12/1999 | McCormack et al. | |
| 6,008,276 A | 12/1999 | Kalbe et al. | |
| 6,015,764 A | 1/2000 | McCormack et al. | |
| 6,020,425 A | 2/2000 | Wang et al. | |
| 6,060,638 A | 5/2000 | Paul et al. | |
| 6,063,866 A | 5/2000 | Wang et al. | |
| 6,075,118 A | 6/2000 | Wang et al. | |
| 6,096,809 A | 8/2000 | Lorcks et al. | |
| 6,110,158 A | 8/2000 | Kielpikowski | |
| 6,111,163 A | 8/2000 | McCormack et al. | |
| 6,135,987 A | 10/2000 | Tsai et al. | |
| 6,150,002 A | 11/2000 | Varona | |
| 6,156,421 A | 12/2000 | Stopper et al. | |
| 6,225,388 B1 | 5/2001 | Tsai et al. | |
| 6,231,970 B1 | 5/2001 | Andersen et al. | |
| 6,235,816 B1 * | 5/2001 | Lorcks et al. | 524/47 |
| 6,258,924 B1 | 7/2001 | Warzelhan et al. | |
| 6,296,914 B1 | 10/2001 | Kerins et al. | |
| 6,297,347 B1 | 10/2001 | Warzelhan et al. | |
| 6,315,864 B2 | 11/2001 | Anderson et al. | |
| 6,326,458 B1 | 12/2001 | Gruber et al. | |
| 6,342,304 B1 * | 1/2002 | Buchanan et al. | 428/480 |
| 6,348,258 B1 | 2/2002 | Topolkaraev | |
| 6,350,518 B1 | 2/2002 | Schertz et al. | |
| 6,369,215 B1 | 4/2002 | Peltonen et al. | |
| 6,414,108 B1 | 7/2002 | Warzelhan et al. | |
| 6,417,312 B1 | 7/2002 | Kirchmeyer et al. | |
| 6,461,457 B1 | 10/2002 | Taylor et al. | |
| 6,469,099 B1 | 10/2002 | Farah et al. | |
| 6,511,464 B1 | 1/2003 | Suekane | |
| 6,514,602 B1 * | 2/2003 | Zhao et al. | 428/212 |
| 6,517,625 B2 | 2/2003 | Bassi et al. | |
| 6,530,910 B1 | 3/2003 | Pomplun et al. | |
| 6,544,455 B1 | 4/2003 | Tsai | |
| 6,552,124 B2 | 4/2003 | Wang et al. | |
| 6,552,162 B1 | 4/2003 | Wang et al. | |
| 6,565,640 B1 | 5/2003 | Bengs et al. | |
| 6,569,225 B2 | 5/2003 | Edmundson et al. | |
| 6,605,367 B2 | 8/2003 | Bassi et al. | |
| 6,660,211 B2 | 12/2003 | Topolkaraev | |
| 6,663,611 B2 | 12/2003 | Blaney et al. | |
| 6,676,984 B1 | 1/2004 | Sharp et al. | |
| 6,703,115 B2 | 3/2004 | Hale et al. | |
| 6,709,147 B1 | 3/2004 | Rauwendaal | |
| 6,709,671 B2 | 3/2004 | Zerbe et al. | |
| 6,713,595 B2 | 3/2004 | Chung et al. | |
| 6,746,705 B2 | 6/2004 | Altieri et al. | |
| 6,749,795 B2 | 6/2004 | Murphy | |
| 6,756,172 B2 | 6/2004 | Ueno et al. | |
| 6,767,961 B1 | 7/2004 | Wang et al. | |
| 6,806,353 B2 | 10/2004 | Zhang et al. | |
| 6,838,403 B2 | 1/2005 | Tsai et al. | |
| 6,888,044 B2 | 5/2005 | Fell et al. | |
| 6,890,989 B2 | 5/2005 | Wang et al. | |
| 6,905,759 B2 | 6/2005 | Topolkaraev | |
| 6,921,581 B2 | 7/2005 | Van Gelder et al. | |
| 6,933,335 B1 | 8/2005 | Berger et al. | |
| 6,946,506 B2 | 9/2005 | Bond et al. | |
| 6,958,371 B1 | 10/2005 | Wang et al. | |
| 6,984,426 B2 | 1/2006 | Miksic et al. | |
| 6,987,138 B2 | 1/2006 | Tokiwa et al. | |
| 6,989,193 B2 * | 1/2006 | Haile et al. | 428/364 |
| 7,045,650 B2 | 5/2006 | Lawrey et al. | |
| 7,053,151 B2 | 5/2006 | Wang et al. | |
| 7,077,994 B2 * | 7/2006 | Bond et al. | 422/1 |
| 7,098,292 B2 | 8/2006 | Zhao et al. | |
| 7,124,450 B2 | 10/2006 | Davidson | |
| 7,153,354 B2 | 12/2006 | Narayan et al. | |
| 7,153,569 B2 | 12/2006 | Kaufman et al. | |
| 7,172,814 B2 | 2/2007 | Hodson | |
| 7,176,251 B1 * | 2/2007 | Bastioli et al. | 524/47 |
| 7,235,594 B2 | 6/2007 | Han et al. | |
| 7,241,832 B2 | 7/2007 | Khemani et al. | |
| 7,297,394 B2 | 11/2007 | Khemani et al. | |
| 7,307,125 B2 | 12/2007 | Chundury et al. | |
| 7,368,160 B2 | 5/2008 | Inglis | |
| 7,368,503 B2 | 5/2008 | Hale | |
| 7,402,618 B2 | 7/2008 | Xu | |
| 7,413,731 B2 | 8/2008 | Heltovics et al. | |
| 7,452,927 B2 * | 11/2008 | Hayes | 523/223 |
| 7,776,020 B2 * | 8/2010 | Kaufman et al. | 604/385.22 |
| 7,888,405 B2 * | 2/2011 | Gohil et al. | 523/124 |
| 2002/0098341 A1 | 7/2002 | Schiffer et al. | |
| 2003/0015826 A1 | 1/2003 | Topolkaraev et al. | |
| 2003/0021973 A1 | 1/2003 | Topolkaraev et al. | |
| 2003/0077395 A1 | 4/2003 | Bassi et al. | |
| 2003/0099692 A1 | 5/2003 | Lydzinski et al. | |

| | | | |
|---|---|---|---|
| 2003/0100645 | A1 | 5/2003 | Ahmed et al. |
| 2003/0162013 | A1 | 8/2003 | Topolkaraev et al. |
| 2003/0191210 | A1* | 10/2003 | Autran ............................ 523/105 |
| 2003/0232933 | A1 | 12/2003 | Lagneaux et al. |
| 2004/0034149 | A1 | 2/2004 | Garcia |
| 2004/0060112 | A1 | 4/2004 | Fell et al. |
| 2004/0102750 | A1 | 5/2004 | Jameson |
| 2004/0108611 | A1 | 6/2004 | Dennis et al. |
| 2004/0254332 | A1* | 12/2004 | Hayes ............................ 528/296 |
| 2005/0054255 | A1 | 3/2005 | Morman et al. |
| 2005/0059941 | A1 | 3/2005 | Baldwin et al. |
| 2005/0112350 | A1 | 5/2005 | Ning |
| 2005/0112363 | A1 | 5/2005 | Ning |
| 2005/0182196 | A1* | 8/2005 | Khemani et al. ............... 525/178 |
| 2005/0186256 | A1 | 8/2005 | Dihel et al. |
| 2005/0208294 | A1 | 9/2005 | Kaufman et al. |
| 2005/0244606 | A1 | 11/2005 | Egawa |
| 2005/0258562 | A1 | 11/2005 | Wilson et al. |
| 2006/0135728 | A1 | 6/2006 | Peerlings et al. |
| 2006/0149199 | A1 | 7/2006 | Topolkaraev et al. |
| 2007/0031555 | A1 | 2/2007 | Axelrod et al. |
| 2007/0049685 | A1 | 3/2007 | Hansel et al. |
| 2007/0049719 | A1 | 3/2007 | Brauer et al. |
| 2007/0129467 | A1 | 6/2007 | Scheer |
| 2007/0246867 | A1 | 10/2007 | Nelson et al. |
| 2007/0259195 | A1* | 11/2007 | Chou et al. ..................... 428/480 |
| 2007/0298237 | A1 | 12/2007 | Goino et al. |
| 2008/0147034 | A1 | 6/2008 | Wang et al. |
| 2009/0054548 | A1 | 2/2009 | Wang et al. |

FOREIGN PATENT DOCUMENTS

| | | |
|---|---|---|
| EP | 1235879 B1 | 5/2004 |
| EP | 1075188 B1 | 11/2005 |
| WO | WO 9923187 A1 | 5/1999 |
| WO | WO 0136535 A1 | 5/2001 |
| WO | WO 0151546 A1 | 7/2001 |
| WO | WO 02053376 A2 | 7/2002 |
| WO | WO 2005113616 A2 | 12/2005 |
| WO | WO 2005113616 A3 | 12/2005 |
| WO | WO 2005116118 A1 | 12/2005 |
| WO | WO 2008027046 A1 | 3/2008 |

OTHER PUBLICATIONS

ASTM D 1238-04c—*Standard Test Method for Melt Flow Rates of Thermoplastics by Extrusion Plastometer*, Current edition approved Dec. 1, 2004, Originally approved in 1965, pp. 1-14.

ASTM D 1343-56—*Standard Method of Test for Viscosity of Cellulose Derivatives by Ball-Drop Method*, Adopted 1956, pp. 486-489.

ASTM D 1505-03—*Standard Test Method for Density of Plastics by the Density-Gradient Technique*, Current edition approved Nov. 1, 2003, Originally approved in 1957, pp. 1-7.

ASTM D 1525-07—*Standard Test Method for Vicat Softening Temperature of Plastics*, Current edition approved Mar. 1, 2007, Originally approved in 1958, pp. 1-9.

ASTM D 3418-03 (D 3417-99)—*Standard Test Method for Transition Temperatures and Enthalpies of Fusion and Crystallization of Polymers by Differential Scanning Calorimetry*, Current edition approved Dec. 1, 2003, Originally approved in 1976, pp. 66-72.

ASTM D 3806-98 (Reapproved 2004)—*Standard Test Method of Small-Scale Evaluation of Fire-Retardant Paints (2-Foot Tunnel Method)*, Current edition approved Jun. 1, 2004, Originally approved in 1979, pp. 1-6.

ASTM D 5338-92—*Standard Test Method for Determining Aerobic Biodegradation of Plastic Materials Under Controlled Composting Conditions*, Current edition approved Dec. 15, 1992, pp. 456-461.

ASTM D 638-08—*Standard Test Method for Tensile Properties of Plastics*, Current edition approved Apr. 1, 2008, Originally approved in 1941, pp. 1-16.

ASTM D 790-99—*Standard Test Methods for Flexural Properties of Unreinforced and Reinforced Plastics and Electrical Insulating Materials*, Current edition approved Nov. 10, 1999, pp. 150-158.

Article—*Aging Properties of Films of Plasticized Vital Wheat Gluten Cast from Acidic and Basic Solutions*, Olabarrieta et al., Biomacromolecules, vol. 7, No. 5, 2006, pp. 1657-1664.

Article—*Biodegradable Compositions by Reactive Processing of Aliphatic Polyester/Polysaccharide Blends*, Dubois et al., Macromol. Symp., vol. 198, 2003, pp. 233-243.

Article—*Biodegradable Soy Protein-Polyester Blends by Reactive Extrusion Process*, Graiver et al., Journal of Applied Polymer Science, vol. 92, 2004, pp. 3231-3239.

Article—*Chemical Modification of Starch*, Tomasik et al., Advances in Carbohydrate Chemistry and Biochemistry, vol. 59, 2004, pp. 175-316.

Article—*Edible Protein Films and Coatings*, Food Proteins and Their Applications edited by S. Damodaran and A. Paraf, John M. Krochta, 1997, pp. 529-539.

Article—*Effects of Extruder Die Nozzle Dimensions on Expansion and Micrographic Characterization During Extrusion of Acetylated Starch*, Ganjyal et al., Starch/Stärke, vol. 56, 2004, pp. 108-117.

Article—*Extrusion of Wheat Gluten Plasticized with Glycerol: Influence of Process Conditions on Flow Behavior, Rheological Properties and Molecular Size Distribution*, Redl et al., Cereal Chemistry, vol. 76, No. 3, 1999, pp. 361-370.

Article—*Glycol Glucosides from Starch by Continuous Twin-Screw Extruder Processing*, Carr et al., Cereal Chemistry, vol. 66, No. 3, 1989, pp. 238-243.

Article—*Heat and shear mediated polymerization of plasticized wheat gluten protein upon mixing*, Redl et al., Journal of Cereal Science 38, 2003, pp. 105-114.

Article—*Polyurethane/Polyolefin Blends: Morphology, Compatibilization and Mechanical Properties*, Wang et al., Polymers & Polymer Composites, vol. 14, No. 1, 2006, 11 pages.

Article—*Preparation of Acetylated Distarch Adipates by Extrusion*, Mali et al., Lebensmittel-Wissenschaft und-Technologie, vol. 34, No. 6, 2001, pp. 384-389.

Article—*Reactivity of Wheat Gluten Protein during Mechanical Mixing: Radical and Nucleophilic Reactions for the Addition of Molecules on Sulfur*, Auvergne et al., Biomacromolecules, vol. 9, No. 2, 2008, pp. 664-671.

Article—*Soy Protein-Based Biodegradable Plastics*, Mungara et al., Proceedings in Plastics Impact on the Environment Conference, Society of Plastic, Feb. 2003, pp. 393-397.

Article—*Starch Modification, Destruction and Hydrolysis during O-Formylation*, Divers et al., Starch/Stärke 56, 2004, pp. 389-398.

Article—*The chemical modification of a range of starches under aqueous reaction conditions*, Fang et al., Carbohydrate Polymers 55, 2004, pp. 283-289.

Article—*The History of Tomorrow's Materials: Protein-Based Biopolymers*, Ralston et al., Plastics Engineering, Feb. 2008, pp. 36-40.

Article—*The Hydroxypropylation of Starch in a Self-Wiping Twin Screw Extruder*, De Graaf et al., Advances in Polymer Technology, vol. 22, No. 1, 2003, pp. 56-68.

Article—*Thermoplastic Processing of Protein-Based Bioplastics: Chemical Engineering Aspects of Mixing, Extrusion and Hot Molding*, Pommet et al., Macromol. Symp., vol. 197, 2003, pp. 207-217.

Article—*Thermoplastic Processing of Proteins for Film Formation—A Review*, Hernandez-Izquierdo et al., Journal of Food Science, vol. 73, No. 2, 2008, pp. R30-R39.

Related U.S. Patent Applications.

Y.S. Hu et al. "Solid-State Structure of Copolyesters Containing a Mesogenic Monomer," *Macromolecules*, vol. 37, No. 6, Feb. 2004: pp. 2128-2135.

"Product Information Ecoflex® F BX 7011", BASF The Chemical Company, May 26, 2004: 6 pages.

American Society for Testing Materials (ASTM) Designation: D5034-95, "Standard Test Method for Breaking Strength and Elongation of Textile Fabrics (Grab Test)," pp. 674-681, published Jul. 1995.

International Search Report and Written Opinion for Application No. PCT/US2006/034070, Completed Feb. 28, 2007, 8 pages.

* cited by examiner

FILM FORMED FROM A BLEND OF BIODEGRADABLE ALIPHATIC-AROMATIC COPOLYESTERS

BACKGROUND OF THE INVENTION

Disposable absorbent products (e.g., diapers, feminine hygiene products, incontinence products, etc.) are subjected to one or more liquid insults, such as of water, urine, menses, or blood, during use. Many commercially available diapers allow water vapor to pass through the diaper and into the environment to lessen the amount of moisture held against the skin and reduce the chance of skin irritation and rash due to skin overhydration. To allow the passage of vapor through the diaper and into the environment while holding liquid, a "breathable" outer cover is often employed that is formed from a nonwoven web laminated to a film. The film contains a filler (e.g., calcium carbonate) that causes a series of micropores to develop in the film when stretched. The micropores form what is often referred to as "tortuous pathways" through the film. Liquid contacting one side of the film does not have a direct passage through the film. Instead, a network of microporous channels in the film prevents liquids from passing, but allows gases and water vapor to pass. One shortcoming with such microporous films is that they are generally formed from polyolefins (e.g., LLDPE), which are not biodegradable. Consequently, various attempts have been made to form microporous films from a biodegradable polymer, such as an aliphatic-aromatic copolyester. Such attempts, however, are generally designed only for a specific application and lack the wide range of flexibility in processing and physical properties often needed for films having a large number of potential uses.

As such, a need currently exists for a technique for forming biodegradable films that may be readily adapted to numerous potential applications.

SUMMARY OF THE INVENTION

In accordance with one embodiment of the present invention, a film is disclosed that comprises a biodegradable polymer blend. The biodegradable polymer blend contains from about 15 wt. % to about 85 wt. % of a first aliphatic-aromatic copolyester and from about 15 wt. % to about 85 wt. % of a second aliphatic-aromatic copolyester. The first aliphatic-aromatic copolyester is formed from a first aromatic monomer that includes terephthalic acid or a derivative thereof and the second aliphatic-aromatic copolyester is formed from a second aromatic monomer that includes phthalic acid or a derivative thereof, isophthalic acid or a derivative thereof, or a combination of the foregoing.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
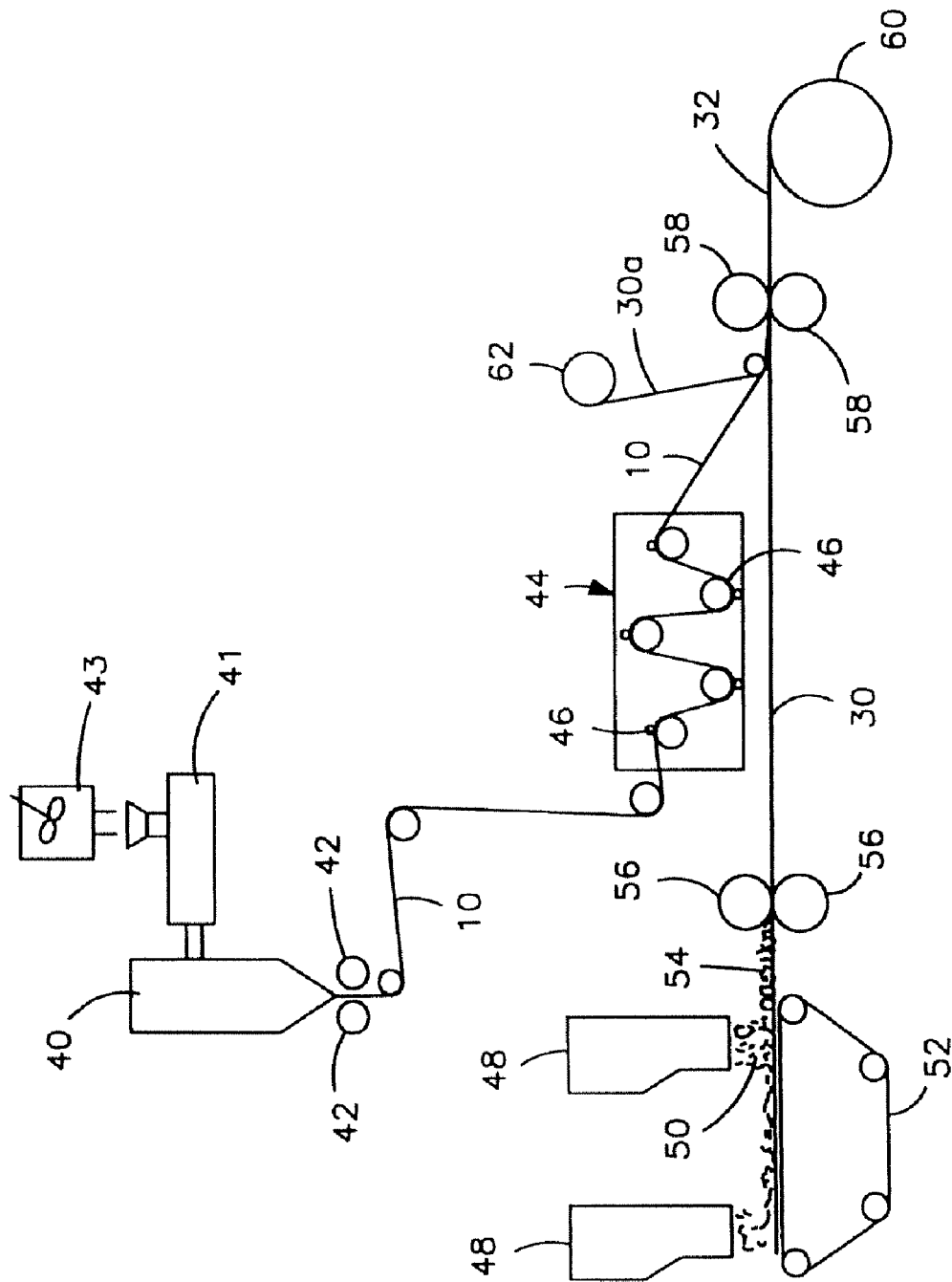
FIG. 1 is a schematic illustration of one embodiment for forming a film/nonwoven laminate in accordance with the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "biodegradable" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "breathable" means pervious to water vapor and gases, but impermeable to liquid water. The "breathability" of a material is measured in terms of water vapor transmission rate (WVTR), with higher values representing a more breathable material and lower values representing a less breathable material. The "water vapor transmission rate" (WVTR) generally refers to the rate at which water vapor permeates through a material as measured in units of grams per meter squared per 24 hours ($g/m^2/24$ hrs). The test used to determine the WVTR of a material may vary based on the nature of the material. For instance, one technique for measuring WVTR involves the use of a PERMATRAN-W 100K water vapor permeation analysis system, which is commercially available from Modern Controls, Inc. of Minneapolis, Minn. Such a system may be particularly well suited for materials thought to have a WVTR of greater than about 2,000 $g/m^2/24$ hrs. It should be understood, however, that other systems and techniques for measuring WVTR may also be utilized in the present invention.

As used herein, the term "nonwoven web" refers to a web having a structure of individual threads (e.g., fibers or filaments) that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, educative drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. The filaments may, for example, have a length much greater than their diameter, such as a length to diameter ratio ("aspect ratio") greater than about 15,000 to 1, and in some cases, greater than about 50,000 to 1. The filaments may sometimes have diameters less than about 40 micrometers, and are often between about 5 to about 20 micrometers.

DETAILED DESCRIPTION

The present invention is directed to a film that is formed from a biodegradable polymer blend of different aliphatic-aromatic copolyesters. More specifically, the blend contains a first copolyester formed from a terephthalic acid monomer. The use of a terephthalic acid monomer results in a polymer chain containing 1,4-(para-) terephthalate units linked in a generally linear configuration (e.g., ~180°). The blend also contains a second aliphatic-aromatic copolyester formed from a phthalic acid and/or isophthalic acid monomer. The use of such a monomer results in a polymer chain containing 1,2-(ortho-) and/or 1,3-(meta-) linked units. The inclusion of 1,2-(ortho-) and/or 1,3-(meta-) linked units into the polymer backbone of the second copolyester introduces an angle or "kink" (e.g., ~120° kink for a 1,3-linkage) into the otherwise linear polymer chain. The "kinks" in the second copolyester backbone reduce its melting point and degree of crystallinity, which have an influence on its physical properties (e.g., toughness, tensile strength, and crystallization rate). Thus, the physical properties of the second copolyester may differ substantially from those of the first copolyester.

In this regard, the "kinked" second copolyester can provide flexibility for forming films with a wide range of properties that is superior to that which may be achieved using either of copolyesters alone. For example, an increased amount of the first aliphatic-aromatic copolyester may result in a film that has a low melting point and is relatively soft, which may be desirable in certain applications (e.g., personal care absorbent articles). Alternatively, an increased amount of the second aliphatic-aromatic copolyester may result in a film that has a high melting point and is relatively stiff and rigid, which may be desirable in other applications (e.g., bandages). Typically, the first aliphatic-aromatic copolyester constitutes from about 15 wt. % to about 85 wt. %, in some embodiments from about 25 wt. % to about 75 wt. %, and in some embodiments, from about 30 wt. % to about 70 wt. % of the polymer blend used to form the film. The second aliphatic-aromatic copolyester likewise typically constitutes from about 15 wt. % to about 85 wt. %, in some embodiments from about 25 wt. % to about 75 wt. %, and in some embodiments, from about 30 wt. % to about 70 wt. % of the polymer blend.

Various embodiments of the present invention will now be described in more detail.

I. First Aromatic-Aliphatic Copolyester

The first aliphatic-aromatic copolyester is typically synthesized through the condensation polymerization of a polyol in conjunction with aliphatic and aromatic dicarboxylic acids or anhydrides thereof. The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the copolyester prepolymer to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The polyol used to form the first copolyester may be substituted or unsubstituted, linear or branched, polyols selected from polyols containing 2 to about 10 carbon atoms, polyalkylene ether glycols containing 2 to 10 carbon atoms, and cycloaliphatic diols containing about 4 to about 12 carbon atoms. Substituted polyols typically contain 1 to about 4 substituents independently selected from halo, $C_6$-$C_{10}$ aryl and $C_1$-$C_4$ alkoxy. Examples of polyols that may be used include, but are not limited to, ethylene glycol, diethylene glycol, 1,2-propanediol ("propylene glycol"), 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

The aliphatic dicarboxylic acid may include substituted or unsubstituted, linear or branched, non-aromatic dicarboxylic or cycloaliphatic acids, as well as derivatives thereof, such as esters (e.g., monoesters, diesters, etc.), anhydrides (e.g., terephthalic anhydride), and so forth. Particularly suitable aliphatic dicarboxylic acids contain from about 2 to about 12 carbon atoms. Non-limiting examples of aliphatic and cycloaliphatic dicarboxylic acids include malonic, succinic, glutaric, adipic, oxalic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic acid.

The aromatic dicarboxylic acid is terephthalic acid or a derivative thereof, including esters (e.g., monoesters, diesters, etc.), anhydrides (e.g., terephthalic anhydride), and so forth. Suitable esters of terephthalic acid may include alkyl, cycloalkyl and alkoxyalkyl terephthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl terephthalates include, for instance, monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisoundecyl terephthalate, diisododecyl terephthalate, di-n-octadecyl terephthalate, diisooctadecyl terephthalate, di-n-eicosyl terephthalate, ditridecyl terephthalate, diisotridecyl terephthalate, monocyclohexyl terephthalate, dicyclohexyl terephthalate, etc.

The terephthalic acid monomer constituent may be present in the first copolyester in an amount of from about 10 mole % to about 45 mole %, in some embodiments from about 15 mole % to about 35 mole %, and in some embodiments, from about 15 mole % to about 30 mole %. The aliphatic dicarboxylic acid monomer constituent may likewise be present in the first copolyester in an amount of from about 15 mole % to about 45 mole %, in some embodiments from about 20 mole % to about 40 mole %, and in some embodiments, from about 25 mole % to about 35 mole %. The polyol monomer constituent may be present in the first copolyester in an amount of from about 30 mole % to about 65 mole %, in some embodiments from about 40 mole % to about 50 mole %, and in some embodiments, from about 45 mole % to about 55 mole %. Mixtures of two or more different polyols may also be employed.

In one particular embodiment, for example, the first aliphatic-aromatic copolyester may comprise the following structure:

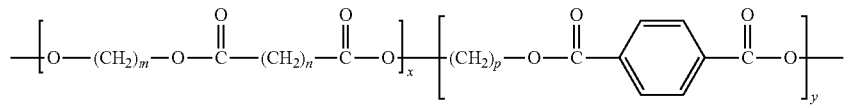

wherein, m is an integer from 2 to 10, in some embodiments from 2 to 4, and in one embodiment, 4;

n is an integer from 0 to 18, in some embodiments from 2 to 4, and in one embodiment, 4;

p is an integer from 2 to 10, in some embodiments from 2 to 4, and in one embodiment, 4;

x is an integer greater than 1, and in some embodiments, from 2 to 100; and y is an integer greater than 1, and in some embodiments from 2 to 100. One example of such a copolyester is polybutylene adipate terephthalate, which is commercially available under the designation ECOFLEX® F BX 7011 from BASF Corp. Another example of a suitable copolyester containing an aromatic terephthalic acid monomer constituent is available under the designation ENPOL™ 8060M from IRE Chemicals (South Korea). Other suitable aliphatic-aromatic copolyesters for use as the first copolyester may be described in U.S. Pat. Nos. 5,292,783; 5,446,079; 5,559,171; 5,580,911; 5,599,858; 5,817,721; 5,900,322; and 6,258,924, which are incorporated herein in their entirety by reference thereto for all purposes.

The first aliphatic-aromatic copolyester typically has a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polymer also typically has a weight average molecular weight ("$M_w$") ranging from about 70,000 to about 360,000 grams per mole, in some embodiments from about 80,000 to about 250,000 grams per mole, and in some embodiments, from about 100,000 to about 200,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.2 to about 2.0, and in some embodiments, from about 1.4 to about 1.8. The weight and number average molecular weights may be determined by methods known to those skilled in the art. The melt flow index of the first aromatic-aliphatic polyester may also range from about 0.1 to about 10 grams per 10 minutes, in some embodiments from about 0.5 to about 8 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E.

The first aliphatic-aromatic copolyester also typically has a melting point of from about 80° C. to about 140° C., in some embodiments from about 90° C. to about 130° C., and in some embodiments, from about 100° C. to about 120° C. The glass transition temperature ("$T_g$") of the copolyester is also relatively low to improve flexibility and processability of the polymers. For example, the $T_g$ may be about 25° C. or less, in some embodiments about 0° C. or less, and in some embodiments, about −10° C. or less. The melting temperature and glass transition temperature may be determined using differential scanning calorimetry ("DSC") in accordance with ASTM D-3417.

II. Second Aromatic-Aliphatic Copolyester

Similar to the first aliphatic-aromatic copolyester, the second copolyester is also typically synthesized through the condensation polymerization of a polyol in conjunction with aliphatic and aromatic dicarboxylic acids or anhydrides thereof, such as described above. Rather than terephthalic acid, however, the aromatic dicarboxylic acids employed for the second copolyester are phthalic acid, isophthalic acid, derivatives thereof, including esters (e.g., monoesters, diesters, etc.), anhydrides (e.g., terephthalic anhydride), etc., and mixtures thereof. Suitable esters of phthalic and/or isophthalic acid may include alkyl, cycloalkyl and alkoxyalkyl phthalates and/or isophthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl phthalates include, for instance, monomethyl phthalate, dimethyl phthalate, diethyl phthalate, di-n-propyl phthalate, di-n-butyl phthalate, di-tert-butyl phthalate, diisobutyl phthalate, monoglycol esters of phthalic acid, diglycol esters of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, di-isoundecyl phthalate, diisododecyl phthalate, di-n-octadecyl phthalate, diisooctadecyl phthalate, di-n-eicosyl phthalate, monocyclohexyl phthalate, dicyclohexyl phthalate, etc. Likewise, suitable isophthalates may include monomethyl isophthalate, dimethyl isophthalate, diethyl isophthalate, di-n-propyl isophthalate, di-n-butyl isophthalate, di-tert-butyl isophthalate, diisobutyl isophthalate, monoglycol esters of isophthalic acid, diglycol esters of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, di-isoundecyl isophthalate, diisododecyl isophthalate, di-n-octadecyl isophthalate, diisooctadecyl isophthalate, di-n-eicosyl isophthalate, monocyclohexyl isophthalate, dicyclohexyl isophthalate, and so forth.

The phthalic and/or isophthalic acid monomer constituent may be present in the second copolyester in an amount of from about 10 mole % to about 45 mole %, in some embodiments from about 15 mole % to about 35 mole %, and in some embodiments, from about 15 mole % to about 30 mole %. The aliphatic dicarboxylic acid monomer constituent may likewise be present in the second copolyester in an amount of from about 15 mole % to about 45 mole %, in some embodiments from about 20 mole % to about 40 mole %, and in some embodiments, from about 25 mole % to about 35 mole %. The polyol monomer constituent may be present in the second copolyester in an amount of from about 30 mole % to about 65 mole %, in some embodiments from about 40 mole % to about 50 mole %, and in some embodiments, from about 45 mole % to about 55 mole %.

In one particular embodiment, for example, the second aliphatic-aromatic copolyester may comprise the following structure:

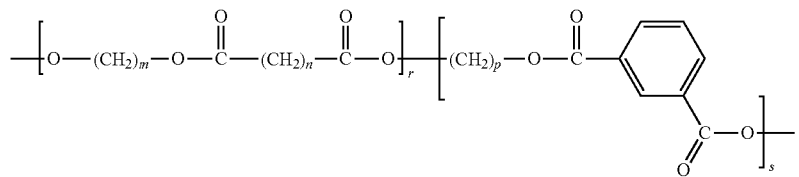

wherein, m is an integer from 2 to 10, in some embodiments from 2 to 4, and in one embodiment, 2;

n is an integer from 0 to 18, in some embodiments from 2 to 4, and in one embodiment, 2;

p is an integer from 2 to 10, in some embodiments from 2 to 4, and in one embodiment, 2;

r is an integer greater than 1, and in some embodiments, from 2 to 100; and s is an integer greater than 1, and in some embodiments, from 2 to 100. One example of such a copolyester is polyethylene adipate isophthalate, which is commercially available under the designation ECOPOL™ EBP 203, 206F, 1250, or 1306 from Econeer Co., Ltd. (Korea). Another suitable example of such a copolyester is polybutylene adipate isophthalate.

The second aliphatic-aromatic copolyester typically has a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polymer also typically has a weight average molecular weight ("$M_w$") ranging from about 70,000 to about 360,000 grams per mole, in some embodiments from about 80,000 to about 300,000 grams per mole, and in some embodiments, from about 100,000 to about 200,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.2 to about 2.0, and in some embodiments, from about 1.4 to about 1.8. The second aliphatic-aromatic copolyester also typically has a melting point of from about 50° C. to about 160° C., in some embodiments from about 60° C. to about 140° C., and in some embodiments, from about 60° C. to about 110° C. The glass transition temperature may be about 25° C. or less, in some embodiments about 0° C. or less, and in some embodiments, about −10° C. or less. Further, the melt flow index of the second aromatic-aliphatic polyester may also range from about 0.1 to about 10 grams per 10 minutes, in some embodiments from about 0.5 to about 8 grams per 10 minutes, and in some embodiments, from about 1 to about 5 grams per 10 minutes.

III. Other

In addition to the polymers noted above, it should be understood that other components may also be included within the polymer blend. For example, the polymer blend may include an additional polyester, such as aliphatic polyesters, e.g., polylactic acid (PLA) and its copolymers, terpolymers based on polylactic acid, polyglycolic acid, polyalkylene carbonates (such as polyethylene carbonate), polyhydroxyalkanoates (e.g., polyhydroxybutyrate, polyhydroxybutyrate-co-valerate, polyhydroxybutyrate-co-hexanoate, etc.), polycaprolactone, succinate-based aliphatic polymers (e.g., polybutylene succinate, polybutylene succinate adipate, and polyethylene succinate); aromatic polyesters; or other aliphatic-aromatic copolyesters. When employed, such additional polyester(s) typically constitute from about 0.1 wt. % to about 20 wt. %, and in some embodiments, from about 1 wt. % to about 15 wt. % of the blend.

IV. Film Construction

The film of the present invention may have a mono-layered or multi-layered structure. Multilayer films normally contain at least one base layer and at least one skin layer, but may contain any number of layers desired. For example, the multilayer film may be formed from a base layer and one or more skin layers, wherein the base layer is formed from the polymer blend of the present invention. The skin layer(s) may be formed from any film-forming polymer. If desired, the skin layer(s) may contain a softer, lower melting polymer or polymer blend that renders the layer(s) more suitable as heat seal bonding layers for thermally bonding the film to a nonwoven web. In most embodiments, the skin layer(s) are formed from a biodegradable polymer. It should be understood, however, that other polymers may also be employed in the skin layer(s), either alone or in conjunction with biodegradable polymers, such as polyolefin polymers (e.g., linear low-density polyethylene (LLDPE), low density polyethylene (LDPE), or polypropylene). The term "linear low density polyethylene" refers to polymers of ethylene and higher alpha olefin comonomers, such as $C_3$-$C_{12}$ and combinations thereof, having a Melt Index (as measured by ASTM D-1238) of from about 0.5 to about 30 grams per 10 minutes at 190° C. Examples of predominately linear polyolefin polymers include, without limitation, polymers produced from the following monomers: ethylene, propylene, 1-butene, 4-methyl-pentene, 1-hexene, 1-octene and higher olefins as well as copolymers and terpolymers of the foregoing. In addition, copolymers of ethylene and other olefins including butene, 4-methyl-pentene, hexene, heptene, octene, decene, etc., are also examples of predominately linear polyolefin polymers. Additional film-forming polymers that may be suitable for use with the present invention, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

When employed, each skin layer may separately comprise from about 0.5% to about 15% of the total thickness of the film, and in some embodiments from about 1% to about 10% of the total thickness of the film. For instance, each skin layer may have a thickness of from about 0.1 to about 10 micrometers, in some embodiments from about 0.5 to about 5 micrometers, and in some embodiments, from about 1 to about 2.5 micrometers. Likewise, the base layer may have a thickness of from about from about 1 to about 40 micrometers, in some embodiments from about 2 to about 25 micrometers, and in some embodiments, from about 5 to about 20 micrometers.

Depending on the intended application, the film may be generally liquid and vapor-impermeable or generally liquid impermeable, yet vapor-permeable (i.e., "breathable"). Breathable films, for example, are often used in absorbent articles (e.g., outer cover) in which it is desired to allow moisture to escape from the absorbent core through the film. Similarly, bandages or wound dressings often employ breathable films that allow the release of moisture from the skin at the wound site. Breathable films may be formed with the use of a filler. Filled films may be made breathable by stretching, which causes the polymer to break away from the filler and create microporous passageways. Techniques for forming microporous films are described, for example, in U.S. Patent Application Publication Nos. 2005/0208294 to Kaufman, et al. and 2006/0149199 to Topolkaraev, et al., which are incorporated herein in their entirety by reference thereto for all purposes.

The filler may have an average size of from about 0.5 to about 10 micrometers, in some embodiments from about 1 to about 8 micrometers, and in some embodiments, from about 2 to about 6 micrometers. Suitable particles for use as a filler may include calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives, cyclodextrins, synthetic polymers (e.g., polystyrene), and so forth. Still other suitable particles are described in U.S. Pat. Nos. 6,015,764 and 6,111,163 to McCormack, et al.; 5,932,497 to Morman, et al.; 5,695,868 to McCormack; 5,855,999 to McCormack, et al.; 5,997,981 to McCormack et al.; and 6,461,457 to Taylor, et al., which are incorporated herein in their entirety by reference thereto for all purposes.

In one particular embodiment, the filler is formed from calcium carbonate. If desired, the type of calcium carbonate employed for the first filler may be selected to enhance breathability. For example, calcium carbonate particles may be employed that have a purity of at least about 95 wt. %, in some embodiments at least about 98 wt. %, and in some embodiments, at least about 99 wt. %. Such high purity calcium carbonates are generally fine, soft, and round, and thus provide a more controlled and narrow particle size for improving the breathability of the film. An example of such a high purity calcium carbonate is Caribbean micritic calcium carbonate, which is mined from soft and friable, finely divided, chalk-like marine sedimentary deposits frequently occurring as surface deposits in the Caribbean (e.g., Jamaica). Such calcium carbonates typically have an average particle size of about 10 micrometers or less, and desirably about 6 micrometers or less. Other examples of Caribbean micritic calcium carbonates are described in U.S. Pat. No. 5,102,465 to Lamond, which is incorporated herein in its entirety by reference thereto for all purposes. Such calcium carbonates may be wet or dry ground, and classified into a narrow particle size distribution with round or spherical-shaped particles. One particularly suitable micritic calcium carbonate is available from Specialty Minerals under the designation "MD1517."

Although not required, the filler may optionally be coated with a modifier (e.g., fatty acid, such as stearic acid or behenic acid) to facilitate the free flow of the particles in bulk and their ease of dispersion into the biodegradable polymer. Further, the filler may also be coated with a liquid additive to reduce coupling at the resin-filler interface and facilitate debonding of filler from polymer matrix during stretching. This is especially useful for the polar biodegradable polymers, which demonstrate strong interaction with fillers. Examples of such additives include surfactants, such as silicone glycol copolymers available from Dow Corning Corporation. Other suitable additives for this purpose may include titanates available from Kenrich Petrochemicals, Inc. of Bayonne, N.J. under the designations Ken-React® LICA® 01, React® LICA® 12, Ken-React® CAPOW®, Ken-React® CAPS® and zirconates available from Kenrich under the designation Ken-React® CAPS NZ 01/L. The filler may be pre-compounded with such additives before mixing with the resin, or the additives may be compounded with the resin and fillers at the melt-blending step.

The total filler content in the film may range from about 15 wt. % to about 75 wt. %, in some embodiments, from about 20 wt. % to about 70 wt. %, and in some embodiments, from about 25 wt. % to about 65 wt. %. Likewise, the biodegradable polymer blend may constitute from about 25 wt. % to about 85 wt. %, in some embodiments, from about 30 wt. % to about 80 wt. %, and in some embodiments, from about 35 wt. % to about 75 wt. % of the film. The first aliphatic-aromatic copolyester may, for example, constitute from about 5 wt. % to about 50 wt. %, in some embodiments 10 wt. % to about 40 wt. %, and in some embodiments, from about 15 wt. % to about 35 wt. % of the film. The second aliphatic-aromatic copolyester may also constitute from about 5 wt. % to about 50 wt. %, in some embodiments 10 wt. % to about 40 wt. %, and in some embodiments, from about 15 wt. % to about 35 wt. % of the film.

In addition to the components noted above, other additives may also be incorporated into the film of the present invention, such as melt stabilizers, processing stabilizers, heat stabilizers, light stabilizers, antioxidants, heat aging stabilizers, whitening agents, antiblocking agents, bonding agents, etc. Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers.

Further, hindered phenols are commonly used as an antioxidant in the production of films. Some suitable hindered phenols include those available from Ciba Specialty Chemicals under the trade name "Irganox®", such as Irganox® 1076, 1010, or E 201. Moreover, bonding agents may also be added to the film to facilitate bonding of the film to additional materials (e.g., nonwoven web). Examples of such bonding agents include hydrogenated hydrocarbon resins. Other suitable bonding agents are described in U.S. Pat. Nos. 4,789,699 to Kieffer et al. and 5,695,868 to McCormack, which are incorporated herein in their entirety by reference thereto for all purposes.

In one particular embodiment, the film may employ a lubricant that helps create an interface between the polymer and filler, thereby enhancing the degree of debonding that occurs to improve breathability. The lubricant may also migrate to the surface of the film during extrusion to improve its processability. The lubricants are typically liquid at room temperature and substantially immiscible with water. Non-limiting examples of such lubricants include oils (e.g., petroleum based oils, vegetable based oils, mineral oils, natural or synthetic oils, silicone oils, lanolin and lanolin derivatives, kaolin and kaolin derivatives, and so forth); esters (e.g., cetyl palmitate, stearyl palmitate, cetyl stearate, isopropyl laurate, isopropyl myristate, isopropyl palmitate, and so forth); glycerol esters; ethers (e.g., eucalyptol, cetearyl glucoside, dimethyl isosorbicide polyglyceryl-3 cetyl ether, polyglyceryl-3 decyltetradecanol, propylene glycol myristyl ether, and so forth); alkoxylated carboxylic acids; alkoxylated alcohols; fatty alcohols (e.g., octyldodecanol, lauryl, myristyl, cetyl, stearyl and behenyl alcohol, and so forth); etc. In one particular embodiment, the lubricant is alpha tocephrol (vitamin E) (e.g., Irganox® E 201). Other suitable lubricants are described in U.S. Patent Application Publication No. 2005/0258562 to Wilson, et al., which is incorporated herein in its entirety by reference thereto for all purposes. Organopolysiloxane processing aids may also be employed that coat the metal surface of melt-processing equipment and enhance ease of processing. Examples of suitable polyorganosiloxanes are described in U.S. Pat. Nos. 4,535,113; 4,857,593; 4,925,890; 4,931,492; and 5,003,023, which are incorporated herein in their entirety by reference thereto for all purposes. A particular suitable organopolysiloxane is SILQUEST® PA-1, which is commercially available from GE Silicones.

When employed, additives (e.g., lubricant, antioxidant, stabilizer, etc.) may each be present in an amount of from about 0.001 wt. % to about 1 wt. %, in some embodiments, from about 0.005 wt. % to about 1 wt. %, and in some embodiments, from 0.01 wt. % to about 0.5 wt. % of the film.

The properties of the resulting film may generally vary as desired. For example, the film may exhibit a water vapor transmission rate (WVTR) of about 800 grams/m²-24 hours or more, in some embodiments about 1,000 grams/m²-24 hours or more, in some embodiments about 1,200 grams/m²-24 hours or more, and in some embodiments, from about 1,500 to about 10,000 grams/m²-24 hours. The film may also limit the amount of liquid water that passes therethrough upon the application of pressure, i.e., it resists a hydrostatic pressure ("hydrohead") of about 50 millibar or more, in some embodiments about 70 millibar or more, in some embodiments about 80 millibar or more, and in some embodiments, about 100 millibar or more without allowing liquid water to pass. The film of the present invention may also retain good mechanical properties. For example, the film of the present invention may exhibit a relatively high "peak load", which indicates the maximum load to break as expressed in units of grams-force per inch. The MD peak load may, for instance, be about 800 grams-force per inch ("g$_f$/in") or more, in some embodiments about 1200 g$_f$/in or more, and in some embodiments, about 1500 g$_f$/in or more. The film of the present invention may also exhibit a relatively high a peak elongation (i.e., the percent elongation at its peak load) in the machine direction ("MD"), such as about 15% or more, in some embodiments about 25% or more, and in some embodiments, about 40% or more.

IV. Articles

The film of the present invention may be used in a wide variety of applications. For example, as indicated above, the film may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, and so forth; medical absorbent articles, such as garments, fenestration materials, underpads, bedpads, bandages, absorbent drapes, and medical wipes; food service wipers; clothing articles; and so forth. Materials and processes suitable for forming such absorbent articles are well known to those skilled in the art. Several examples of such absorbent articles are described, for instance, in U.S. Pat. Nos. 5,649,916 to DiPalma, et al.; 6,110,158 to Kielpikowski; 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. Nos. 4,886,512 to Damico et al.; 5,558,659 to Sherrod et al.; 6,888,044 to Fell et al.; and 6,511,465 to Freiburger et al., all of which are incorporated herein in their entirety by reference thereto for all purposes.

When incorporated into an absorbent article, it is often desired that the film is breathable. In personal care absorbent articles (e.g., diapers, feminine care pads, etc.), for instance, such breathable films may be used to form an outer cover as is known in the art. If desired, the breathable film may be laminated to a nonwoven web material formed from a wide variety of polymers as is known in the art. Polymers suitable for making nonwoven webs include, for example, polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; polyhydroxyalkanoates (e.g., polyhydroxybutyrate, polyhydroxybutyrate-co-valerate, polyhydroxybutyrate-co-hexanoate, etc.); copolymers thereof; and so forth. If desired, biodegradable polymers may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

If desired, the nonwoven web material used to form the nonwoven laminate may itself have a multi-layer structure. Suitable multi-layered materials may include, for instance, spunbond/meltblown/spunbond (SMS) laminates and spunbond/meltblown (SM) laminates. Various examples of suitable SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

A nonwoven web material may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven fabric. Hydraulically entangled nonwoven fabrics of staple length and continuous fibers are disclosed, for example, in U.S. Pat. Nos. 3,494,821 to Evans and 4,144,370 to Boulton, which are incorporated herein in their entirety by reference thereto for all purposes. Hydraulically entangled composite nonwoven fabrics of a continuous fiber nonwoven web and a pulp layer are disclosed, for example, in U.S. Pat. Nos. 5,284,703 to Everhart, et al. and 6,315,864 to Anderson, et al., which are incorporated herein in their entirety by reference thereto for all purposes. The fibrous component of the composite may contain any desired amount of the resulting substrate. The fibrous component may contain greater than about 50% by weight of the composite, and in some embodiments, from about 60% to about 90% by weight of the composite. Likewise, the nonwoven web may contain less than about 50% by weight of the composite, and in some embodiments, from about 10% to about 40% by weight of the composite.

Although not required, the nonwoven web material may be necked or stretched in one or more directions prior to lamination to the film of the present invention. Alternatively, the nonwoven web may remain relatively inextensible in at least one direction prior to lamination to the film. In such embodiments, the nonwoven web may be optionally stretched in one or more directions subsequent to lamination to the film.

Referring to FIG. 1, one embodiment of a method for forming a laminate from a film and a nonwoven web material is shown. As shown, the raw materials (e.g., first aliphatic-aromatic copolyester, second aliphatic-aromatic copolyester, and filler) may be dry mixed together (i.e., without a solvent) and added to a hopper 43 of an extruder 41. The raw materials may alternatively be blended with a solvent. In the hopper 43, the materials are dispersively mixed in the melt and compounded using any known technique, such as batch and/or continuous compounding techniques that employ, for example, a Banbury mixer, Farrel continuous mixer, single screw extruder, twin screw extruder, etc. A mixer/kneader may be employed that operates in conjunction with a single screw compounding extruder to improve its mixing efficiency. The mixers may be formed or integrated directly onto the screw, barrel, or both. For instance, U.S. Pat. No. 6,709, 147 to Rauwendaal describes a suitable mixer in which the barrel of the extruder includes one or more axial rows of kneading elements arranged along an inner surface of the screw passageway in a high pressure stage of the extruder, as well as complementary shaped slots formed in the screw flights. In operation, the kneading elements move through the slots of the screw flights to create an efficient mixing action of the melt being pumped therebetween. The kneading elements, teeth or pins, are often press-fit, or threaded into the barrel of the extruder. Such a mixer/kneader (also available under the designation "Buss Ko-Kneader" from Coperion Holding GmbH) may be employed to compound the materials through a gentle "folding and relaxing" batch process that allows for cooler process temperatures and helps maintain the polymer structure.

Because aliphatic-aromatic copolyesters are generally hydrophilic, excess moisture may lead to premature degradation and reduced melt strength during film casting. Thus, in some cases, the biodegradable polymer resin may be dried prior to compounding, such as to a moisture content of about 1000 ppm water or less, in some embodiments about 500 ppm water or less, and in some embodiments, about 150 ppm water or less. If desired, a vacuum pressure may be supplied during compounding to remove any excess moisture or low molecular weight factions. The vacuum pressure may be about 500 Torr or less, in some embodiments about 200 Torr or less, and in some embodiments, about 70 Torr or less.

Any known technique may be used to form a film from the compounded material, including blowing, casting, flat die extruding, etc. For example, in the particular embodiment of FIG. 1, the compounded material (not shown) is supplied to an extrusion apparatus 40 and then cast into nip rolls 42 to form a single-layered precursor film 10. If a multilayer film is to be produced, the multiple layers are co-extruded together into the nip rolls 42. One or both of the rolls 42 may optionally be provided with embossing elements to impart a pattern to the film. Typically, the rolls 42 are kept at temperature sufficient to solidify and quench the film 10 as it is formed, such as from about 20 to 60° C. If desired, a vacuum box may be positioned adjacent to the rolls 42 to help keep the precursor film 10 close to the surface of the rolls 42. Additionally, air knives or electrostatic pinners may help force the precursor film 10 against the surface of the rolls 42 as it moves around a spinning roll. An air knife is a device known in the art that focuses a stream of air at a very high flow rate to pin the edges of the film.

Once cast, the precursor film 10 may then be stretched in one or more directions to form pores in the film. Although not required, the film may be stretched in-line without having to remove the film for separate processing. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" stretched film may then be laminated to a fibrous web. In addition, the uniaxially stretched film may also be oriented in the cross-machine direction to form a "biaxially stretched" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

To achieve the desired breathability of the film, various parameters of the stretching operation may be selectively controlled, including the draw ratio, stretching temperature, and so forth. The draw ratio may be determined by dividing the linear speed of the film exiting the stretching operation by the linear speed of the film entering the stretching operation. In some embodiments, for example, the film is stretched in the machine direction at a draw ratio of from about 1.5 to about 10.0, in some embodiments from about 2.0 to about 6.0, and in some embodiments, from about 2.5 to about 5.0. Likewise, the film may be stretched at a temperature less than the melting temperature of the polymers contained therein, such as from about 15° C. to about 60° C., in some embodiments from about 25° C. to about 50° C., and in some embodiments, from about 30° C. to about 40° C. After stretching, the film is optionally heat-set to stabilize the stretched film. Heat-setting may be accomplished at temperatures of from about 40° C. to about 80° C., and in some embodiments, from about 50° C. to about 70° C. The heat-setting operation may reduce shrinkage of the stretched film and improve film properties and breathability. Any known in the art techniques for heat setting could be used including heated rolls and oven setting. Additional treatments may be applied to improve stretched film properties such as surface treatments, UV treatments, ultrasonic treatments, and plasma treatments.

Referring again to FIG. 1, one method for forming a uniaxially stretched film is shown. As illustrated, the precursor film 10 is directed to a film-orientation unit 44 or machine direction orienter ("MDO"), such as commercially available from Marshall and Willams, Co. of Providence, R.I. The MDO has a plurality of stretching rolls 46 (such as from five to fifteen) which progressively stretch and thin the film in the machine direction, which is the direction of travel of the film through the process as shown in FIG. 1. While the MDO 44 is illustrated with five rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 44 may act as preheat rolls. If present, these first few rolls heat the film 10 above room temperature. The progressively faster speeds of adjacent rolls in the MDO act to stretch the film 10. Likewise, if desired, one or more of the rolls of the MDO 44 may also act as heat setting rolls.

Prior to stretching, the filled film 10 typically has a basis weight of about 100 grams per square meter or less, and in some embodiments, from about 50 to about 75 grams per square meter. Upon stretching, the film 10 typically has a basis weight of about 60 grams per square meter or less, and in some embodiments, from about 15 to about 35 grams per square meter. The stretched film 10 may also have a total thickness of from about 1 to about 100 micrometers, in some embodiments, from about 10 to about 80 micrometers, and in some embodiments, from about 20 to about 60 micrometers.

A nonwoven web is also employed for laminating to the stretched film 10. For example, the nonwoven web may simply be unwound from a supply roll. Alternatively, as shown in FIG. 1, a nonwoven web 30 may be formed in-line, such as by dispensing polymer filaments 50 from a pair of spinnerettes 48 onto a conveyor assembly 52 to form mat 54. The filaments 50 of mat 54 are then compressed to form inter-filament bonding using a pair of nip rollers 56, resulting in the spunbonded web 30. If desired, a vacuum (not shown) may be utilized to maintain the fibers on the conveyor assembly. Following compaction, the nonwoven web 30 is directed to a nip defined between rolls 58 for laminating to the film 10.

Various techniques may be utilized to bond the film 10 to the nonwoven web 30, including adhesive bonding, such as through slot or spray adhesive systems; thermal bonding; ultrasonic bonding; microwave bonding; extrusion coating; and so forth. Examples of suitable adhesives that may be used in the present invention include Rextac 2730 and 2723 available from Huntsman Polymers of Houston, Tex., as well as adhesives available from Bostik Findley, Inc, of Wauwatosa, Wis. The basis weight of the adhesive may be between about 1.0 and 3.0 grams per square meter. The type and basis weight of the adhesive used will be determined on the attributes desired in the final laminate and end use. Although not required, the adhesive may be applied directly to the nonwoven web prior to lamination with the film. Further, to achieve improved drape, the adhesive may be applied in a pattern. In FIG. 1, the film 10 is simultaneously bonded on its other side to a second material 30a originating from a supply roll 62. The second material 30a may be a second nonwoven web, or another film layer. The resulting laminate 32 is wound and stored on a supply roll 60. If desired, the laminate 32 may also be optionally stretched in the cross-machine and/or machine directions to enhance its extensibility.

The present invention may be better understood with reference to the following examples.

EXAMPLES

The following test methods were employed in the examples.

Test Methods

Breathability:

The WVTR (water vapor transmission rate) value of was determined using the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR", which is incorporated herein in its entirety by reference thereto for all purposes. The INDA test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modem Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow that is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}{}_{test\ material} = TR^{-1}{}_{test\ material,guardfilm,airgap} - TR^{-1}{}_{guardfilm,airgap}$$

The water vapor transmission rate ("WVTR") is then calculated as follows:

$$WVTR = \frac{F_{\rho sat(T)} RH}{A P_{sat(T)}(1 - RH)}$$

wherein,

F=the flow of water vapor in cm³ per minute;

$\rho_{sat(T)}$=the density of water in saturated air at temperature T;

RH=the relative humidity at specified locations in the cell;

A=the cross sectional area of the cell; and $P_{sat(T)}$=the saturation vapor pressure of water vapor at temperature T.

Tensile Properties

The strip tensile strength values were determined in substantial accordance with ASTM Standard D-5034. A constant-rate-of-extension type of tensile tester was employed. The tensile testing system was a Sintech 1/D tensile tester, which is available from Sintech Corp. of Cary, N.C. The tensile tester was equipped with TESTWORKS 4.08B software from MTS Corporation to support the testing. An appropriate load cell was selected so that the tested value fell within the range of 10-90% of the full scale load. The film samples were initially cut into dog-bone shapes with a center width of 3.0 mm before testing. The samples were held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run using a gauge length of 18.0 millimeters and a break sensitivity of 40%. Five samples were tested by applying the test load along the machine-direction ("MD") and five samples were tested by applying the test load along the cross-machine direction ("CD"). During the test, samples were stretched at a crosshead speed of abut 127 millimeters per minute until breakage occurred. The modulus, peak stress, peak strain (i.e., % strain at peak load), and elongation were measured.

Thermal Properties:

Differential scanning calorimetry (DSC) was performed to determine the melting peaks for the polymers. The differential scanning calorimeter was a THERMAL ANALYST 2910 Differential Scanning Calorimeter, which was outfitted with a liquid nitrogen cooling accessory and with a THERMAL ANALYST 2200 (version 8.10) analysis software program, both of which are available from T.A. Instruments Inc. of New Castle, Del. To avoid directly handling the samples, tweezers or other tools were used. The samples were placed into an aluminum pan and weighed to an accuracy of 0.01 milligram on an analytical balance. A lid was crimped over the material sample onto the pan. Typically, the resin pellets were placed directly in the weighing pan, and the fibers were cut to accommodate placement on the weighing pan and covering by the lid.

The differential scanning calorimeter was calibrated using an indium metal standard and a baseline correction was performed, as described in the operating manual for the differential scanning calorimeter. A material sample was placed into the test chamber of the differential scanning calorimeter for testing, and an empty pan is used as a reference. All testing was run with a 55-cubic centimeter per minute nitrogen (industrial grade) purge on the test chamber. For resin pellet samples, the heating and cooling program was a 2-cycle test that began with an equilibration of the chamber to −50° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −50° C., followed by equilibration of the sample at −50° C. for 3 minutes, and then a second heating period at a heating rate of 10° C. per minute to a temperature of 200° C. For fiber samples, the heating and cooling program was a 1-cycle test that began with an equilibration of the chamber to −50° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −50° C. All testing was run with a 55-cubic centimeter per minute nitrogen (industrial grade) purge on the test chamber.

The results were then evaluated using the THERMAL ANALYST 2200 (version 8.10) analysis software program, which identified and quantified the glass transition temperature of inflection, the endothermic and exothermic peaks, and the areas under the peaks on the DSC plots. The glass transition temperature was identified as the region on the plot-line where a distinct change in slope occurred, and the melting temperature was determined using an automatic inflection calculation. The areas under the peaks on the DSC plots were determined in terms of joules per gram of sample (J/g). For example, the heat of fusion of a resin or fiber sample was determined by integrating the area of the endothermic peak. The area values were determined by converting the areas under the DSC plots (e.g., the area of the endotherm) into the units of joules per gram (J/g) using computer software.

Examples 1-5

The ability to form a microporous film from an aliphatic-aromatic copolyester formed from a dimethyl isophthalate monomer was demonstrated. More specifically, the aliphatic-aromatic copolyester was obtained from Econeer, Inc. under the designation "Ecopol™ EBP 203." Ecopol™ EBP 203 had two melting peaks of 106° C. and 112° C., and the respective enthalpies of melting were 6 and 9 J/mol.

Two types of inorganic fillers were also used, i.e., "2sst" $CaCO_3$ (Omya, Inc. Alpharetta, Ga.), and Microtalc™ MP 3036 (Barretts Minerals, Inc. Dillon, Mont.). The mean particle size for 2sst $CaCO_3$ was 2 microns. Microtalc™ MP 3036 had a median particle size is 3 microns and contained about 61% silicon dioxide and 31% magnesium oxide. Blends of the polymer and fillers were made using ZSK-30 extruder (Werner and Pfleiderer Corporation, Ramsey, N.J.), which is a co-rotating, twin screw extruder. The extruder diameter was 30 mm with the length of the screws up to 1328 mm. The extruder had 14 barrels, numbered consecutively 1-14 from the feed hopper to the die. The Ecopol™ EBP 203 resin was added to K-Tron feeder (K-Tron America, Pitman, N.J.) that vertically fed the resin into ZSK-30 extruder. The first barrel #1 received the Ecopol™ EBP resin when the extruder was heated to the temperature profile (Barrel #1 was not heated, but cooled) as shown in Table 1. The vent was closed at the end of the extruder without a need of releasing moisture. A 3-hole die of 3 mm diameter that is separated by 10 mm space was used to shape the melt into strands that were cooled on a conveyer belt and then pelletized.

For Examples 2 through 5, different amounts of inorganic fillers were added, ranging from 30 to 50%, respectively. A separate K-Tron side-feeder was laterally attached to ZSK-30 at about one-third barrel length at Barrel #5 as a side feeder to deliver the filler. The compounding process was stable.

TABLE 1

| | | | | | | | | | | | | | | |
|---|---|---|---|---|---|---|---|---|---|---|---|---|---|---|
| | Processing Conditions | | | | | | | | | | | | | |
| Sample No. | Material Feeding Rate (lb/hr) | Ecopol EBP (%) | 2sst CaCO3 (%) | Talc (%) | Extruder Speed (rpm) | Extruder Temperature Profile (° C.) | | | | | | | $P_{melt}$ (psi) | Torque (%) |
| | | | | | | $T_1$ | $T_2$ | $T_3$ | $T_4$ | $T_5$ | $T_6$ | $T_7$ | $T_{melt}$ | |
| Example 1 | 20 | 100 | 0 | 0 | 150 | 130 | 140 | 150 | 155 | 155 | 145 | 140 | 163 | 380~400 | 75~80 |
| Example 2 | 15 | 70 | 30 | 0 | 150 | 130 | 140 | 150 | 155 | 155 | 145 | 140 | 163 | 400~430 | 90~95 |
| Example 3 | 15 | 60 | 40 | 0 | 150 | 130 | 140 | 150 | 155 | 155 | 145 | 140 | 163 | 420~460 | 80~85 |
| Example 4 | 15 | 50 | 50 | 0 | 150 | 130 | 140 | 150 | 155 | 155 | 145 | 140 | 163 | 420~460 | 80~90 |
| Example 5 | 15 | 50 | 0 | 50 | 150 | 130 | 140 | 150 | 155 | 155 | 145 | 140 | 163 | 450~500 | 75~80 |

Examples 6-8

The ability to form a microporous film from a blend of a first aliphatic-aromatic copolyester formed from a terephthalic acid monomer and a second aliphatic-aromatic copolyester formed from a dimethyl isophthalate monomer was demonstrated. More specifically, the first copolyester was obtained from BASF under the designation "Ecoflex® F BX 7011" and the second copolyester was obtained from Econeer, Inc. under the designation "Ecopol™ EBP 203." "2sst" CaCO$_3$ (Omya, Inc. Alpharetta, Ga.) was employed as an inorganic filler. The melting peak of Ecoflex® F BX 7011 was 119° C. and its enthalpy of melting was 19.3 J/mol.

Blends of the polymer and filler were made using ZSK-30 extruder (Werner and Pfleiderer Corporation, Ramsey, N.J.) as described above. The Ecoflex® F BX 7011 and Ecopol™ EBP 203 resins were added to K-Tron feeder (K-Tron America, Pitman, N.J.) that vertically fed the resin into ZSK-30 extruder. Barrel #1 received the Ecopol™ EBP resin and the Ecoflex® F BX 7011 resin when the extruder was heated to the temperature profile (Barrel #1 was not heated, but cooled) as shown in Table 2. The vent was closed at the end of the extruder without a need of releasing moisture. A 3-hole die of 3 mm diameter that is separated by 10 mm space was used to shape the melt into strands that were cooled on a conveyer belt and then pelletized.

Table 2 lists the processing conditions to make blends with mixed Ecopol™ EBP203 and Ecoflex® F BX 7011, where 2sst CaCO$_3$ content was fixed at 50% for Example 6, 7, and 8. The ratio of ECopol™ EBP 203 and Ecoflex® F BX 7011 varied from 35 to 15% for ECopol™ EBP 203 and Ecoflex® F BX 7011 to make up 50% total resins to counter balance 50% 2sst CaCO$_3$ filler. There was a slight increase in die pressures in comparison to those in Table 1, where only Ecopol™ EBP 203 was processed with inorganic fillers, respectively.

Example 9

The blends of Examples 1-8 (Tables 1 and 2) were used to make cast films using a HAAKE Rheomex 252 Single Screw Extruder, fitted with an air pump and a cast film die (8 inches in width). The operating conditions to convert the blends into the film are listed below in Table 3.

TABLE 3

Processing Conditions for Film Casting on HAAKE Extruder Rheomex 252 Single Screw Extruder

| | | |
|---|---|---|
| Screw Speed: | 40~50 rpm | |
| Die gap: | 20 mil | |
| Zone 1: | 180° C. | Temperature |
| Zone 2: | 185° C. | |
| Zone 3: | 185° C. | |
| Zone 4 (pump): | 180° C. | |
| Zone 5 (die): | 180° C. | |
| Melt temperature: | ~190° C. | |
| Film thickness: | ~1.0 mil | |

The converting process by film casting was done successfully when the filler was less than 50%. Otherwise, film casting is difficult, particularly to make 1 mil thickness films.

The mechanical properties of the resulting films were then tested and shown below in Table 4.

TABLE 2

| | | | | | | | | | | | | | | |
|---|---|---|---|---|---|---|---|---|---|---|---|---|---|---|
| | Processing Conditions | | | | | | | | | | | | | |
| Sample No. | Material Feeding Rate (lb/hr) | Ecopol EBP (%) | Ecoflex (%) | 2sst CaCO3 (%) | Extruder Speed (rpm) | Extruder Temperature Profile (° C.) | | | | | | | $P_{melt}$ (psi) | Torque (%) |
| | | | | | | $T_1$ | $T_2$ | $T_3$ | $T_4$ | $T_5$ | $T_6$ | $T_7$ | $T_{melt}$ | |
| Example 6 | 15 | 35 | 15 | 50 | 150 | 130 | 140 | 150 | 155 | 155 | 145 | 140 | 163 | 500~560 | 80~85 |
| Example 7 | 15 | 25 | 25 | 50 | 150 | 95 | 125 | 140 | 150 | 150 | 145 | 130 | 144 | 500~560 | 80~85 |
| Example 8 | 15 | 15 | 35 | 50 | 150 | 95 | 125 | 140 | 150 | 150 | 145 | 130 | 144 | 500~560 | 80~85 |

TABLE 4

Mechanical Properties

| Example No. | Sample Description | Composition | Film Thickness | | Modulus (MPa) | | Peak Stress (MPa) | | Elongation (%) | |
|---|---|---|---|---|---|---|---|---|---|---|
| | | | MD (mil) | CD (mil) | MD | CD | MD | CD | MD | CD |
| Example 1 | Ecopol EBP (control) | 100 | 1.01 | 1.01 | 470 | 364 | 52 | 27 | 169 | 434 |
| Example 2 | Ecopol EBP/2-sst CaCO3 | 70/30 | 1.09 | 0.97 | 511 | 480 | 36 | 20 | 130 | 363 |
| Example 3 | Ecopol EBP/2-sst CaCO3 | 60/40 | 0.95 | 0.97 | 537 | 483 | 32 | 17 | 84 | 268 |
| Example 4 | Ecopol EBP/2-sst CaCO3 | 50/50 | 1.03 | 1.2 | 611 | 545 | 24 | 15 | 56 | 24 |
| Example 5 | Ecopol EBP/Talc | 50/50 | 2.15 | 2.23 | 817 | 708 | 20 | 17 | 7 | 7 |
| Example 6 | Ecopol EBP/Ecoflex/2-sst CaCO3 | 35/15/50 | 1.17 | 1.2 | 453 | 437 | 20 | 14 | 102 | 191 |
| Example 7 | Ecopol EBP/Ecoflex/2-sst CaCO3 | 15/35/50 | 1.14 | 1.22 | 275 | 313 | 19 | 14 | 169 | 456 |
| Example 8 | Ecopol EBP/Ecoflex/2-sst CaCO3 | 25/25/50 | 1.14 | 1.11 | 409 | 300 | 19 | 11 | 134 | 321 |

As indicated, the Microtalc™ filler caused a severe reduction in the film elongation as shown in Example 5. When 2sst CaCO$_3$ was used as filler with Ecopol™ EBP 203 in Examples 2, 3, and 4, the film MD elongation was much lower than the Ecopol™ EBP 203 films without the presence of the filler, as indicated by Example 1. When Ecoflex® F BX 7011 was introduced into the blends, the film showed a good elongation and low modulus, as indicated by Examples 6, 7, and 8.

To evaluate the film breathability, films formed from the blends of Examples 2, 3, 7, and 8 were stretched in the machine direction under ambient conditions. Films from Examples 2 and 3 without the presence of Ecoflex® F BX 7011 were stretched to 150% of their initial length, and films from Examples 7 and 8 were stretched to 200% of their initial length. Upon testing, the samples formed from Examples 2 and 3 (Ecopol™ EBP 203 filled with 2sst CaCO$_3$) exhibited a breathability of about 300 and 800 g/m$^2$/24 hr, while the samples formed from Examples 7 and 8 (Ecopol™ EBP 203 and Ecoflex® F BX 7011 filled with 2sst CaCO$_3$) exhibited a breathability of about 1500 and 4000 g/m$^2$ 124 hours, respectively.

Example 10

Figure 2:
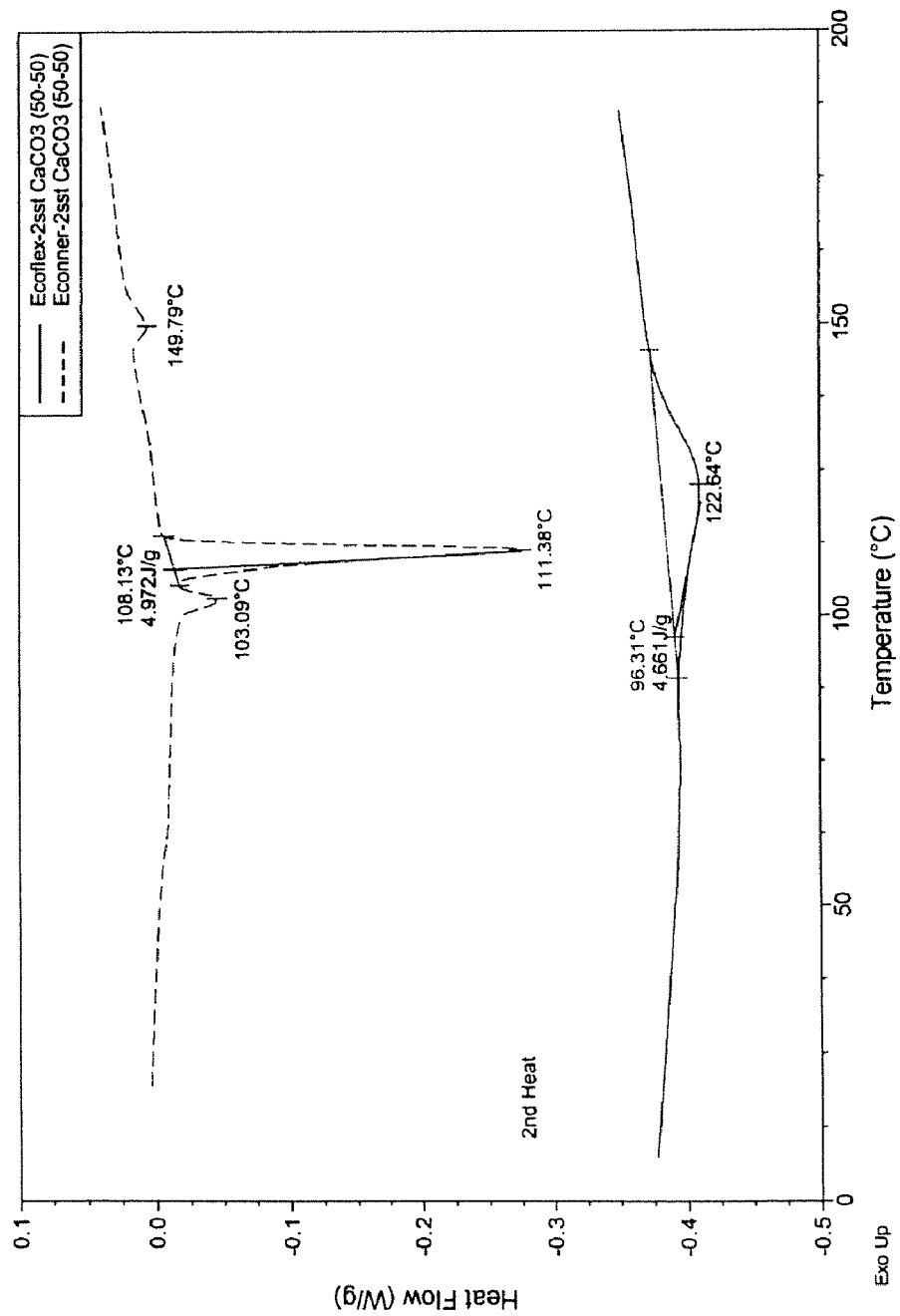
FIG. 2 illustrates the DSC thermogram referenced in Example 10.

DSC thermograms were generated for a blend of Ecopol™ EBP 203 and 2sst CaCO$_3$ (50/50) and Ecoflex® F BX 7011/2sst CaCO$_3$ (50/50), both of which were prepared using a method similar to that described in Example 4. The results are shown in FIG. 2. As indicated, the thermogram for the Ecoflex® F BX 7011 blend (represented by a solid line) shows a single broad melting peak at 123° C. (second heating cycle). The thermogram for the Ecopol™ EBP 203 blend (represented by hyphened line), however, shows more than one melting peak (i.e., three) at 103° C., 111° C., and 150° C., respectively. The peak at 111° C. is significantly sharper than the peak at 123° C. for Ecoflex® F BX 7011.

Example 11

Figure 3:
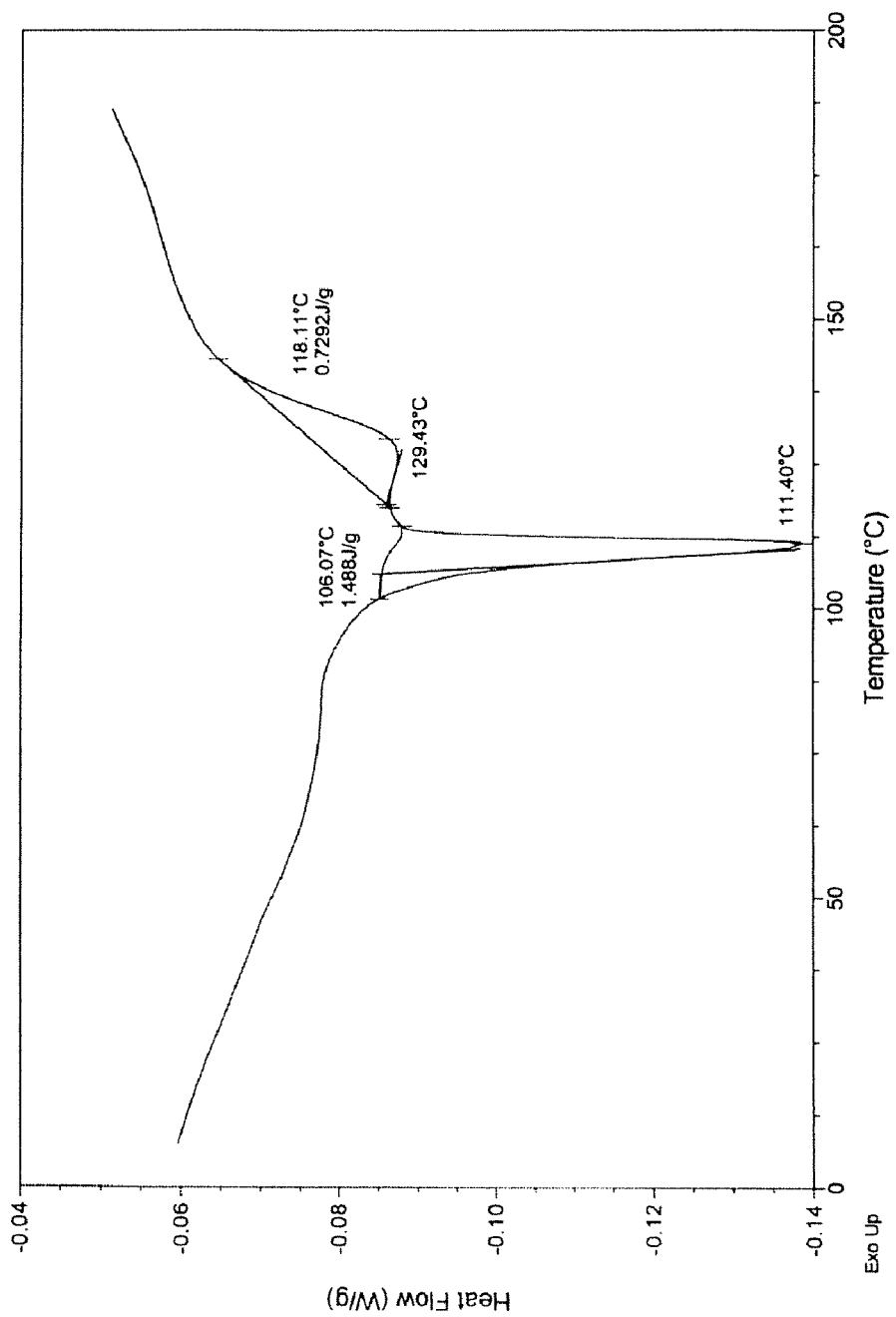
FIG. 3 illustrates the DSC thermogram referenced in Example 11.

A DSC thermogram was generated for a blend of ECopol™ EBP 203, Ecoflex® F BX 7011, and 2sst CaCO$_3$, prepared using a method similar to that described in Example 7. The results are shown in FIG. 3. As indicated, the thermogram shows a sharp peak at 111° C., which corresponds to the melting peak of Ecopol™ EBP 203 shown in FIG. 2. The distinctly different melting peaks evidence the presence of two different types of copolyesters in the composition.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An absorbent article comprising a generally liquid-impermeable, vapor-permeable layer, the layer comprising a microporous film that includes a biodegradable polymer blend, the biodegradable polymer blend containing from about 15 wt. % to about 85 wt. % of a first aliphatic-aromatic copolyester and from about 15 wt. % to about 85 wt. % of a second aliphatic-aromatic copolyester, wherein the first aliphatic-aromatic copolyester is formed from a first aromatic monomer that includes terephthalic acid or a derivative thereof and the second aliphatic-aromatic copolyester is formed from a second aromatic monomer that includes phthalic acid or a derivative thereof, isophthalic acid or a derivative thereof, or a combination of the foregoing, wherein the glass transition temperature of the first aliphatic-aromatic copolyester and the second aliphatic-aromatic copolyester is about 0° C. or less, and wherein the film exhibits a water vapor transmission rate of from about 800 to about 10,000 grams/m$^2$-24 hours wherein the first aliphatic-aromatic copolyester is polybutylene adipate terephthalate, and wherein the second aliphatic-aromatic copolyester is polyethylene adipate isophthalate or polybutylene adipate isophthalate.

2. The absorbent article of claim 1, wherein the first aliphatic-aromatic copolyester has a generally linear chain configuration and the second aliphatic-aromatic copolyester has a kinked chain configuration.

3. The absorbent article of claim 1, wherein the first aliphatic-aromatic copolyester constitutes from about 25 wt % to about 75 wt. % of the polymer blend and the second aliphatic-aromatic copolyester constitutes from about 25 wt. % to about 75 wt. % of the polymer blend.

4. The absorbent article of claim 1, wherein the first aliphatic-aromatic copolyester is represented by the following general structure:

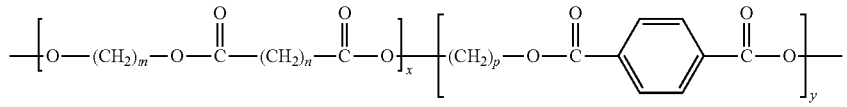

wherein,
m is an integer from 2 to 10;
n is an integer from 0 to 18;
p is an integer from 2 to 10;
x is an integer greater than 1; and
y is an integer greater than 1.

5. The absorbent article of claim 1, wherein the second aromatic monomer is isophthalic acid or an ester thereof.

6. The absorbent article of claim 1, wherein the second aliphatic-aromatic copolyester is represented by the following general structure:

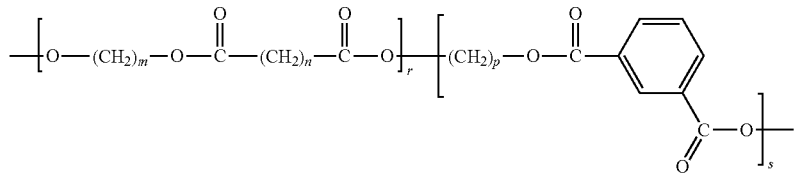

wherein,
m is an integer from 2 to 10;
n is an integer from 0 to 18;
p is an integer from 2 to 10;
r is an integer greater than 1; and
s is an integer greater than 1.

7. The absorbent article of claim 1, further comprising an absorbent core positioned between the generally liquid-impermeable, vapor-permeable layer and a liquid-permeable layer.

8. The absorbent article of claim 1, wherein the microporous film is joined to a nonwoven web material.

9. The absorbent article of claim 1, wherein the first aromatic monomer includes terephthalic acid.

10. The absorbent article of claim 1, wherein the second aromatic monomer includes an alkyl isophthalate.

11. The absorbent article of claim 1, wherein the first aliphatic-aromatic copolyester has a melting point of from about 80° C. to about 140° C. and the second aliphatic-aromatic copolyester has a melting point of from about 50° C. to about 160° C.

12. The absorbent article of claim 1, wherein the blend further includes an aliphatic polyester.

13. The absorbent article of claim 1, wherein the film exhibits a water vapor transmission rate of from about 1,500 to about 10,000 grams/m²-24 hours.

14. The absorbent article of claim 1, wherein the glass transition temperature of the first aliphatic-aromatic copolyester and the second aliphatic-aromatic copolyester is about −10° C. or less.

* * * * *